March 26, 1935.   E. S. MARKS ET AL   1,995,935
SUPERCHARGER FOR INTERNAL COMBUSTION ENGINES
Filed April 1, 1932   2 Sheets-Sheet 1

Edward S. Marks
Carl T. Doman
INVENTORS.

BY Bodell & Thompson
ATTORNEYS.

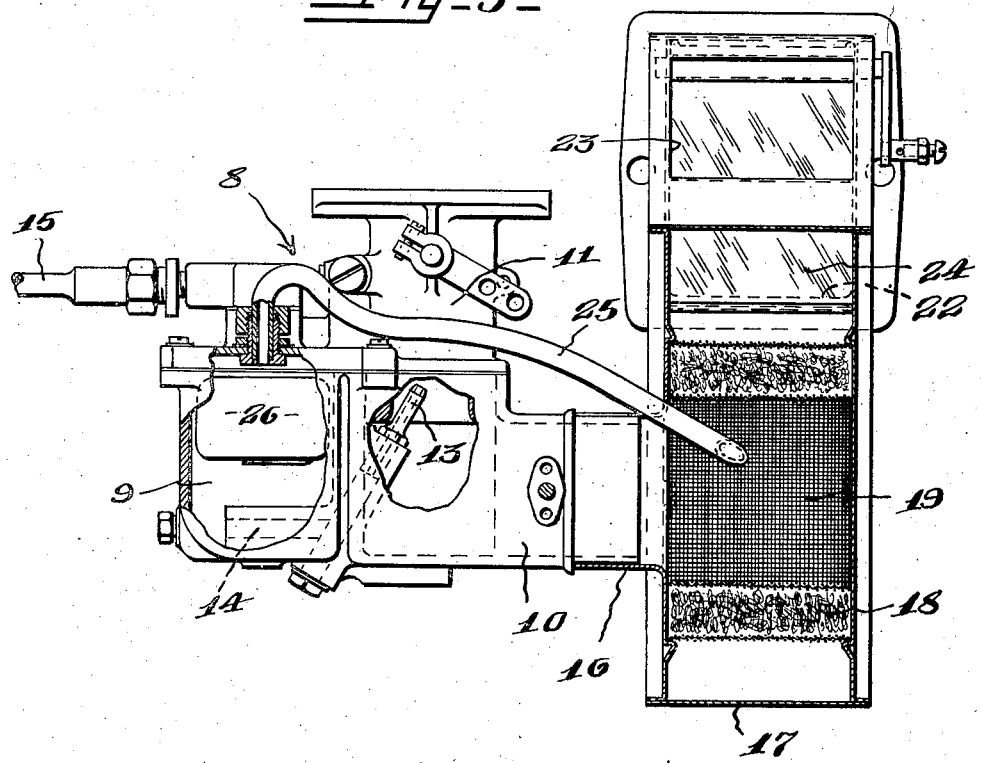

Patented Mar. 26, 1935

1,995,935

UNITED STATES PATENT OFFICE 1,995,935

SUPER-CHARGER FOR INTERNAL COMBUSTION ENGINES

Edward S. Marks and Carl T. Doman, Syracuse, N. Y., assignors to Franklin Development Corporation, Syracuse, N. Y., a corporation of New York Application April 1, 1932, Serial No. 602,484

1 Claim. (Cl. 123—119)

This invention relates to internal combustion engines having a carburetor, or other fuel forming, or vaporizing means, in which the explosive charge is formed by mixing it with air, and has for its object, a particularly simple and efficient means for forcing, or super-charging, air through the air intake of the carburetor.

Another object, is the means for efficiently utilizing the air circulating fan of the internal combustion engine for super-charging the air to the carburetor.

Another object, is means for utilizing the air cooling current of an air cooled engine for supplying the air current to the carburetor, or the connecting of the air intake of the carburetor in the air cooling circulating system.

Other objects appear throughout the specification.

The invention consists in the novel features and in the combinations and constructions hereinafter set forth and claimed.

In describing this invention, reference is had to the accompanying drawings in which like characters designate corresponding parts in all the views.

Figure 3 is an enlarged elevation, partly in section, of a carburetor and the contiguous portion of the super-charging conduit.

Figure 1:
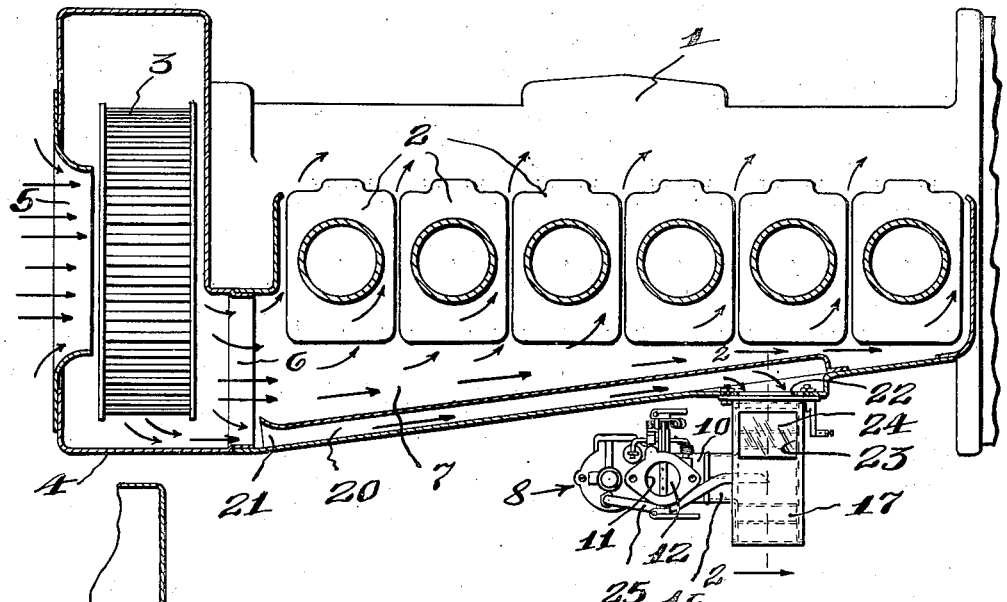
Figure 1 is a horizontal, sectional view of an air cooled engine provided with my invention.
Figure 2:
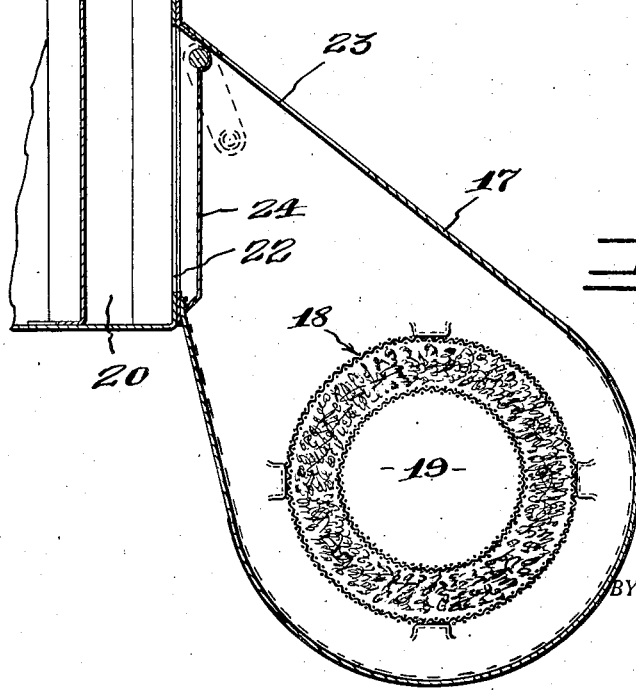
Figure 2 is an enlarged, sectional view on line 2—2, Figure 1.

We have here shown our invention as applied to a multi-cylinder air cooled engine in which the air is discharged by a fan actuated by the engine over, or around, the cylinders, and in the engine illustrated, the air is discharged laterally across and between the cylinders and the heads thereof from one side of the bank of cylinders to the other.

The invention comprises generally, a conduit arranged to receive part of the air current created by the fan of the engine, whether water cooled, or air cooled, and connected to the air intake of the carburetor. It further includes an air conduit connected to the supply chamber for the carburetor, as the float chamber, through which air passes under the same pressure as the air in the conduit connected to the air intake of the carburetor in order to maintain the same proportion of air and motive fluid, or gasoline, under all conditions, as variations in the pressure.

In the engine here illustrated, the air intake of the carburetor is connected in the air cooling system of the air cooled combustion engine of the Franklin type, where the cooling air current is blown from one side of the bank of cylinders around and between the cylinders and the heads thereof, to the other side of the bank.

1 designates the base; 2 the cylinders of the air cooled internal combustion engine; 3 a centrifugal fan rotor, or blower, usually mounted on the front end of the crank shaft of the engine; and 4 a scroll casing surrounding the rotor, or fan, and having an air intake 5 at its front side, and a peripheral air outlet 6 directed rearwardly.

7 designates an air conduit connected to the outlet 6 of the casing and arranged to discharge air, as indicated by the arrows, crosswise of the cylinders and the heads thereof from one side of the bank of cylinders to the other.

8 designates the carburetor, or other fuel forming, or vaporizing device, the term "carburetor" being used merely for convenience, and not in the sense that it strictly speaking carburizes air, or utilizes a hydro-carbon. The carburetor is, with the exception of the modifications hereinafter pointed out, of the usual construction, and that here shown is of the Stromberg type. It includes the usual fuel supply chamber, or float chamber 9, main air intake 10, mixing chamber and outlet 11 having the usual butterfly or throttle valve 12 therein operated in the usual manner, and an atomizing nozzle 13 interposed between the air intake and the mixing chamber. The nozzle is connected to the lower part of the float chamber through the usual duct 14, and the float chamber is connected to a main source of supply through a conduit 15. Carburetors of this type are usually provided with an equalizing duct between the upper part of the float chamber and the mixing chamber. This equalizing passage is dispensed with, or plugged up. The carburetor also has the usual passage connecting the duct 14 and the outlet of the carburetor above the throttle valve for supplying fuel to the engine for idling the engine when the throttle valve is closed.

16 designates a conduit for air under pressure and connected to the air intake 10 of the carburetor, this conduit 16 being connected to a suitable source of supply of air under pressure, it being here shown as connected in the air cooling system of the engine. The conduit 16 includes a casing 17 in which an air screen or filter 18 is located, this screen being shown as made up of inner and outer cylinders of wire mesh with a filtering material between them, the outer cylinder being spaced apart from the walls of the casing to provide a passage for the air around the filter so that the air can enter the filter throughout the circumference thereof. The inner passage 19 of the filter is alined with the main air intake 10 of the carburetor.

Preferably, the casing 17 receives the air current direct from the fan casing 4, and for this purpose communicates with a conduit 20 having its receiving end 21 arranged in juxtaposition to the fan outlet 6. This conduit 20 is of comparatively large area and of the full height of the outlet 6, but of less width than the same. Preferably, the conduit 20 is located within the air conduit 7 and extends along the outer wall thereof. The conduit 20 opens into the casing 17 through a passage 22, and the casing 17 is formed with a passage 23 to the outer air, which passage is normally closed by a valve 24, this valve being operable to open the passage 23 and close the passage 22 so that normally the air is supercharged through the carburetor, but if at any time it is desirable to dispense with the supercharging, the valve can be operated to close the passage 22 and open the passage 23 to the outer air.

The conduit 20 preferably communicates directly with the fan housing in order to conduct cold air to the carburetor so that the supercharging effect will be increased by the expansion of the air when being warmed in any one of the usual ways after passing through the carburetor, but at times it may be desirable to pass warm air through the carburetor and for this purpose, the valve 24 is provided in order that the warmer air under the hood which encloses the engine may be taken into the carburetor. Preferably, the supply chamber for the nozzle of the carburetor is under approximately the same pressure as the supercharged air through the main air intake, this supply chamber being, in this instance, the float chamber of the carburetor. As here illustrated, the air conduit, which supplies air to the air intake of the carburetor, is connected by a pipe or by-pass 25 to the upper part of the float chamber 9 above the float 26 therein.

In the normal operation, the air is blown by the fan 3, through the conduit 20 to the casing 17 whence it passes through the air intake 10 of the carburetor past the nozzle 13 and throttle valve, when open, into the engine cylinders, thus forcing an explosive mixture into the cylinders. At the same time, air under pressure passes through the by-pass 25 to the float chamber, so that the mixture formed at the nozzle is practically the same under all conditions. When it is desired to run the engine, without supercharging, the valve 24 is operated by any suitable means to close the passage 22 and open the passage 23.

What we claim is:

The combination with an air cooled engine, an air cooling system therefor including a fan actuated by the engine, a casing for the fan, and a conduit connected to the casing and arranged to discharge air around the cylinders and being separable from the cylinders and the casing, and a carburetor for the engine having an air intake, of a conduit connecting the air intake to the fan casing and located in the former conduit and removable as a unit therewith.

EDWARD S. MARKS.
CARL T. DOMAN.